United States Patent
Chen et al.

(10) Patent No.: US 11,316,943 B2
(45) Date of Patent: Apr. 26, 2022

(54) SUBSCRIPTION PROCESSING METHOD, NETWORK NODE, AND UNIFIED DATA REPOSITORY

(71) Applicants: China Mobile Communication Co., Ltd Research Institute, Beijing (CN); China Mobile Communications Group Co.,Ltd., Beijing (CN)

(72) Inventors: Xu Chen, Beijing (CN); Yue Song, Beijing (CN); Zhenning Huang, Beijing (CN)

(73) Assignees: China Mobile Communication Co., Ltd Research Institute, Beijing (CN); China Mobile Communications Group Co., Ltd., Beijing (CN)

( * ) Notice: Subject to any disclaimer, the term of this patent is extended or adjusted under 35 U.S.C. 154(b) by 0 days.

(21) Appl. No.: 15/733,709

(22) PCT Filed: Apr. 3, 2019

(86) PCT No.: PCT/CN2019/081249
§ 371 (c)(1),
(2) Date: Oct. 1, 2020

(87) PCT Pub. No.: WO2019/192518
PCT Pub. Date: Oct. 10, 2019

(65) Prior Publication Data
US 2021/0029208 A1     Jan. 28, 2021

(30) Foreign Application Priority Data
Apr. 4, 2018 (CN) .......................... 201810302374.7

(51) Int. Cl.
*H04L 29/08* (2006.01)
*H04L 67/55* (2022.01)
*H04L 67/56* (2022.01)

(52) U.S. Cl.
CPC .............. *H04L 67/26* (2013.01); *H04L 67/28* (2013.01)

(58) Field of Classification Search
None
See application file for complete search history.

(56) References Cited

U.S. PATENT DOCUMENTS

| | | | |
|---|---|---|---|
| 2010/0250677 A1* | 9/2010 | Kahan | H04L 67/24 709/204 |
| 2012/0079082 A1* | 3/2012 | Ding | H04W 8/20 709/220 |

(Continued)

FOREIGN PATENT DOCUMENTS

| CN | 105786876 A | 7/2016 |
|---|---|---|
| CN | 106304351 A | 1/2017 |

(Continued)

OTHER PUBLICATIONS

SA WG2 Meeting #125, Jan. 22-26, 2018, Gothenburg, Sweden, 52-181125, 3 pages.

(Continued)

*Primary Examiner* — James A Edwards
(74) *Attorney, Agent, or Firm* — Price Heneveld LLP (57) ABSTRACT

Provided are a subscription processing method, a network node and a unified data repository. The method includes: receiving a subscription request message sent by a network function NF entity; sending a subscription resource creation request message to a unified data repository UDR according to the subscription request message, wherein the subscription resource creation request message carries an original notification address, the original notification address carried in the subscription resource creation request message is a notification address carried in the subscription request message.

15 Claims, 6 Drawing Sheets

---

Receiving a subscription request message sent by a network function (NF) entity, the subscription request message carries a subscriber address or a notification address, the subscriber address or the notification address carried in the subscription request message is an address of the NF entity — 101

Sending a subscription resource creation request message to a unified data repository (UDR) according to the subscription request message, the subscription resource creation request message carries an original subscriber address or an original notification address, and the original subscriber address of the subscription resource creation request message is a subscriber address carried in the subscription request message, and the original notification address carried in the subscription resource creation request message is a notification address carried in the subscription request message — 102

(56) References Cited

U.S. PATENT DOCUMENTS

| | | | |
|---|---|---|---|
| 2016/0219125 A1* | 7/2016 | Xiao | H04L 67/26 |
| 2017/0303065 A1* | 10/2017 | Li | H04W 4/70 |
| 2019/0132728 A1* | 5/2019 | Shekhar | H04W 8/205 |
| 2019/0230175 A1* | 7/2019 | Wang, IV | H04L 67/26 |
| 2019/0261260 A1* | 8/2019 | Dao | H04W 8/20 |

FOREIGN PATENT DOCUMENTS

| | | |
|---|---|---|
| CN | 106790676 A | 5/2017 |
| WO | 2014169950 A1 | 10/2014 |
| WO | 2017087367 A1 | 5/2017 |
| WO | 2017197273 A1 | 11/2017 |

OTHER PUBLICATIONS

3rd Generation Partnership Project; Technical Specification Group Services and System Aspects; System Architecture for the 5G System; Stage 2 (Release 15) 3GPP TS 23.501, 3 pages.

Huawei, HiSilicon, "Application-influenced SSC and UP management", 3GPP TSG SA WG2 Meeting #119, S2-171066, Feb. 13-Feb. 17, 2017, Dubrovnik, Croatia.

"3rd Generation Partnership Project;Technical Specification Group Core Network and Terminals; 5G System; Policy and Charging Control signalling flows and QoS parameter mapping; Stage 3 (Release 15 )", 3GPP TS 29.513, V0.4.0, (2018-3), Valbonne, France.

\* cited by examiner

SUBSCRIPTION PROCESSING METHOD, NETWORK NODE, AND UNIFIED DATA REPOSITORY

CROSS-REFERENCE TO RELATED APPLICATION

The present disclosure is the U.S. national phase of PCT Application PCT/CN2019/081249 filed on Apr. 3, 2019, which claims a priority of Chinese patent application No. 201810302374.7 filed on Apr. 4, 2018, which is incorporated herein by reference in its entirety.

TECHNICAL FIELD

The present disclosure relates to the field of communication technology, in particular, relates to a subscription processing method, a network node, and a unified data repository.

BACKGROUND

A Unified Data Repository (UDR) of a 5G core network is accessed through a service-based interface. A standard defines that UDM, PCF, and NEF may access the UDR as service users.

In a segmented subscription scenario, to ensure data security of the UDR located in a home network, an access and mobility management function (AMF)/a session management function (SMF)/a visited-network policy control function (v PCF, V means a visited network)/a visited-network network exposure function (vNEF) in the visited network cannot directly subscribe to the UDR in the home network.

The segmented subscription scenario mainly includes:

1) the AMF subscribes user subscription data change to the UDM. After the UDM generates subscription information, the UDM acts as a client and then subscribes the user subscription data change to the UDR.

The subscription request sent by the AMF to the UDM contains a notification address of the AMF.

The subscription request sent by the UDM to the UDR contains a notification address of the UDM.

2) The vPCF subscribes user policy data change to a hPCF (home network PCF). After the hPCF generates subscription information, the hPCF acts as a client to subscribe the user policy data change to the UDR.

3) the vNEF subscribes capability open and application data change to a hNEF (Home Network NEF). After the hNEF generates subscription information, the hNEF acts as a client to subscribe user capability and application data change to the UDR.

In the segmented subscription scenario of a relevant 5G communication system, a network function (NF) entity may only send a subscription request for a subscription service to a determined network node (such as UDM, hPCF, hNEF, etc.), and then the network node records address information of the NF, and initiates a subscription resource creation request to the unified data repository (UDR). After the UDR creates a subscription resource, the UDR will return a subscription resource address of the subscription resource to the network node, so that the network node onwards sends the subscription resource address to the NF based on NF address information recorded by the network node. It may be seen that in the segmented subscription scenario of the relevant communication system, once the network node fails, the NF cannot cancel the subscription service, nor may the NF perform other operations on the subscription service, and the UDR cannot send a notification through the network node.

SUMMARY

An objective of the present disclosure is to provide a subscription processing method, a network node, and a unified data repository, to standardize segmented subscription after a stateless network node is introduced.

On one hand, a subscription processing method applied to a network node is provided in the embodiments of the present disclosure. The method includes: receiving a subscription request message sent by a network function (NF) entity, wherein the subscription request message carries a notification address; sending a subscription resource creation request message to a unified data repository (UDR) according to the subscription request message, wherein the subscription resource creation request message carries a notification address and an original notification address, the original notification address carried in the subscription resource creation request message is the notification address carried in the subscription request message.

Wherein the notification address carried in the subscription request message is an address of the NF.

Wherein, the notification address carried in the subscription resource creation request message is an identifier of a node set to which the network node belongs.

The subscription processing method further includes: receiving a subscription resource creation response message returned by the UDR in response to the subscription resource creation request message, wherein the subscription resource creation response message carries a subscription resource address of a subscription resource created by the UDR according to the subscription resource creation request message, and the subscription resource address of the subscription resource includes a subscription resource identifier allocated by the UDR to the subscription resource; returning a subscription response message for the subscription request message to the NF according to the subscription resource creation response message, wherein the subscription response message carries an identifier of a node set to which the network node belongs and the subscription resource identifier allocated by the UDR to the subscription resource.

The subscription processing method further includes: receiving a subscription deletion request message sent by the NF, wherein the subscription deletion request message carries the identifier of the node set to which the network node belongs and the subscription resource identifier allocated by the UDR to the subscription resource; sending a subscription resource deletion request message to the UDR according to the subscription deletion request message, wherein the subscription resource deletion request message carries the subscription resource identifier allocated by the UDR to the subscription resource.

The subscription processing method further includes: receiving a subscription modification request message sent by the NF, wherein the subscription modification request message carries an identifier of a node set to which the network node belongs and the subscription resource identifier allocated by the UDR to the subscription resource; sending a subscription resource modification request message to the UDR according to the subscription modification request message, wherein the subscription resource modification request message carries the subscription resource identifier allocated by the UDR to the subscription resource.

Wherein, the subscription resource creation request message is specifically a regenerated subscription request message, or a request message updating user data.

The subscription processing method further includes: receiving a notification message sent by the UDR, wherein the notification message carries an identifier of a node set to which the network node belongs and the original notification address carried in the subscription resource creation request message; sending the notification message to the original notification address carried in the notification message according to the original notification address.

Wherein, the notification address in the subscription request message may be an identity or FQDN of the NF, or an IP address of the NF.

Wherein, the network node in the node set is one of UDM, PCF, and NEF.

On the other hand, a subscription processing method applied to unified data repository (UDR) is provided in the embodiments of the present disclosure. The method includes receiving a subscription resource creation request message sent by a network node, wherein the subscription resource creation request message carries a notification address and an original notification address; creating a subscription resource according to the subscription resource creation request message, and storing and associating the subscription resource and the original notification address and the notification address carried in the creation request message.

Wherein, the notification address carried in the subscription resource creation request message is an identifier of a node set to which the network node belongs.

The subscription processing method further includes: sending a subscription resource creation response message to the network node in response to the subscription resource creation request message, wherein the subscription resource creation response message carries a subscription resource address of the subscription resource, and the subscription resource address includes a subscription resource identifier allocated by the UDR to the subscription resource.

The subscription processing method further includes: sending a notification message to the original notification address associated with the subscription resource according to the original notification address.

The subscription processing method further includes: sending a notification message to the notification address associated with the subscription resource according to the notification address, wherein the notification message carries an identifier of a node set to which the network node belongs and an original notification address carried in the subscription resource creation request message.

In addition, a network node is further provided in the embodiments of the present disclosure. The network node includes: a first receiving module, configured for receiving a subscription request message sent by a network function (NF) entity, wherein the subscription request message carries a notification address, the notification address carried by the subscription request message is an address of the NF entity; a first sending module, configured for sending a subscription resource creation request message to a unified data repository (UDR) according to the subscription request message, wherein the subscription resource creation request message carries a notification address and an original notification address, the original notification address carried in the subscription resource creation request message is the notification address carried in the subscription request message.

Wherein the notification address carried in the subscription request message is an address of the NF.

Wherein, the notification address carried in the subscription resource creation request message is an identifier of a node set to which the network node belongs.

The network node further includes a second receiving module, configured for receiving a subscription resource creation response message returned by the UDR in response to the subscription resource creation request message, wherein the subscription resource creation response message carries a subscription resource address of a subscription resource created by the UDR according to the subscription resource creation request message, and the subscription resource address of the subscription resource includes a subscription resource identifier allocated by the UDR to the subscription resource; a second sending module, configured for returning a subscription response message for the subscription request message to the NF according to the subscription resource creation response message, wherein the subscription response message carries an identifier of a node set to which the network node belongs and the subscription resource identifier allocated by the UDR to the subscription resource.

The network node further includes: a third receiving module, configured for receiving a subscription deletion request message sent by the NF, wherein the subscription deletion request message carries the identifier of the node set to which the network node belongs and the subscription resource identifier allocated by the UDR to the subscription resource; a third receiving module, configured for sending a subscription resource deletion request message to the UDR according to the subscription deletion request message, wherein the subscription resource deletion request message carries the subscription resource identifier allocated by the UDR to the subscription resource.

The network node further includes: a fourth receiving module, configured for receiving a subscription modification request message sent by the NF, wherein the subscription modification request message carries an identifier of a node set to which the network node belongs and the subscription resource identifier allocated by the UDR to the subscription resource; a fourth sending module, configured for sending a subscription resource modification request message to the UDR according to the subscription modification request message, wherein the subscription resource modification request message carries the subscription resource identifier allocated by the UDR to the subscription resource.

Wherein, the subscription resource creation request message is specifically a regenerated subscription request message, or a request message updating user data.

The network node further includes: a fifth receiving module, configured for receiving a notification message sent by the UDR, wherein the notification message carries an identifier of a node set to which the network node belongs and the original notification address carried in the subscription resource creation request message; a fifth sending module, configured for sending the notification message to the original notification address carried in the notification message according to the original notification address.

Additionally, a unified data repository (UDR) is further provided in the embodiments of the present disclosure. The UDR includes: a sixth receiving module, configured for receiving a subscription resource creation request message sent by a network node, wherein the subscription resource creation request message carries a notification address and an original notification address; a creation module, configured for creating a subscription resource according to the subscription resource creation request message, and storing and associating the subscription resource and the original notification address and the notification address carried in the creation request message.

Wherein, the notification address carried in the subscription resource creation request message is an identifier of a node set to which the network node belongs.

The UDR further includes: a sixth sending module, configured for sending a subscription resource creation response message to the network node in response to the subscription resource creation request message, wherein the subscription resource creation response message carries a subscription resource address of the subscription resource, and the subscription resource address includes a subscription resource identifier allocated by the UDR to the subscription resource.

The UDR further includes: a seventh sending module, configured for sending a notification message to the original notification address associated with the subscription resource according to the original notification address.

The UDR further includes: an eighth sending module, configured for sending a notification message to the notification address associated with the subscription resource according to the notification address, wherein the notification message carries an identifier of a node set to which the network node belongs and an original notification address carried in the subscription resource creation request message.

Further, a computer device is provided in the embodiments of the present disclosure. The computer device includes a processor, a storage, and a computer program stored on the storage and executable by the processor, wherein when the computer program is executed by the processor, the processor implements the subscription processing method applied to a network node provided in the embodiments of the present disclosure, or the subscription processing method applied to a UDR provided in the embodiments of the present disclosure.

Still further, a computer-readable storage medium is provided in the embodiments of the present disclosure. The computer-readable storage medium includes a computer program stored on the computer-readable storage medium, wherein when the computer program is executed by a processor, the processor implements the subscription processing method applied to a network node provided in the embodiments of the present disclosure, or the subscription processing method applied to a UDR provided in the embodiments of the present disclosure.

The above solutions of the present disclosure have the following beneficial effects:

Based on the solutions of the present disclosure, a network node may inform a UDR of an address of the NF initiating a subscription request, so that the UDR may subsequently directly send a message related to a subscription resource to the address of the NF, thereby realizing segmented subscription for an introduced stateless network node.

DETAILED DESCRIPTION

In order to make technical problems, technical solutions and advantages to be solved by the present disclosure clearer, a detailed description will be given below with reference to the drawings and specific embodiments. In the following description, specific details such as specific configurations and components are provided only to help comprehensive understanding of the embodiments of the present disclosure. Therefore, it should be clear to those skilled in the art that various changes and modifications may be made to the embodiments described herein without departing from the scope and spirit of the present disclosure. In addition, for clarity and conciseness, descriptions of known functions and configurations are omitted.

It should be understood that "one embodiment" or "an embodiment" mentioned throughout the specification means that a specific feature, structure, or characteristic related to the embodiment is included in at least one embodiment of the present disclosure. Therefore, appearance of "in one embodiment" or "in an embodiment" throughout the specification does not necessarily refer to the same embodiment. In addition, these specific features, structures, or characteristics may be combined in one or more embodiments in any suitable manner.

In various embodiments of the present disclosure, it should be understood that values of sequence numbers of the following processes do not mean an order of executing the processes. The order of executing the processes should be determined by functions and internal logic thereof, and should not be form a limitation of implementation processes of the embodiments of the present disclosure.

The present disclosure formulates segmented subscription of a stateless network node.

Figure 1A:
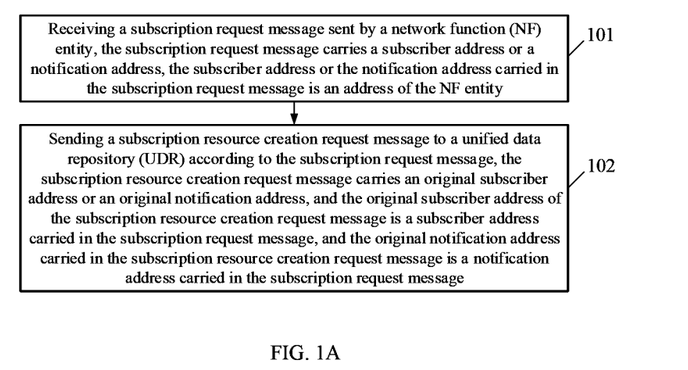
FIG. 1A is a schematic diagram of steps of a subscription processing method applied to a network node according to an embodiment of the present disclosure.

On one hand, the embodiments of the present disclosure provide a subscription processing method, which is applied to a network node (the network node may be a unified data management (UDM) function, a packet control function (PCF) entity, a network service exposure function (NEF), etc.), as shown in FIG. 1A, the method include steps 101-102.

Step 101: receiving a subscription request message sent by a network function (NF) entity.

The subscription request message carries a subscriber address or a notification address. The subscriber address or the notification address carried in the subscription request message is an address of the network function (NF) entity (for example, an identity or FQDN (Fully Qualified Domain Name) of the NF or an IP address of the NF).

The NF sending the subscription request message may be: a NF of an access and mobility management function (AMF), a NF of a policy control function (PCF), a NF of the network service exposure function (NEF), etc.

Step 102: sending a subscription resource creation request message to the unified data repository (UDR) according to the subscription request message.

The subscription resource creation request message carries an original subscriber address or an original notification address, and the original subscriber address of the subscription resource creation request message is the subscriber address carried in the subscription request message, and the original notification address carried in the subscription resource creation request message is a notification address carried in the subscription request message.

Figure 1B:
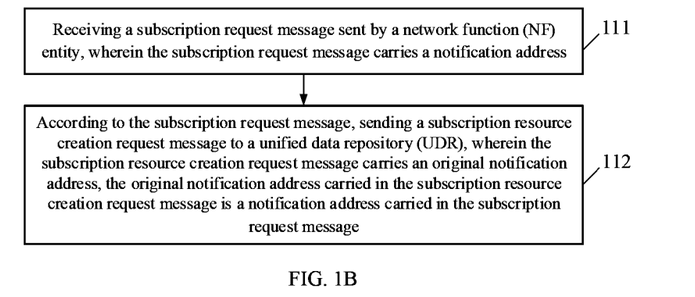
FIG. 1B is another schematic diagram of steps of a subscription processing method applied to a network node according to an embodiment of the present disclosure.

Some embodiments of the present disclosure provide a subscription processing method, which is applied to a network node (such as a unified data management (UDM) function, a packet control function (PCF) entity, a network service exposure function (NEF), etc.), as shown in FIG. 1B, the method includes steps 111 and 112.

Step 111: receiving a subscription request message sent by a network function (NF) entity, wherein the subscription request message carries a notification address.

Step 112: according to the subscription request message, sending a subscription resource creation request message to a unified data repository (UDR), wherein the subscription resource creation request message carries an original notification address, the original notification address carried in the subscription resource creation request message is a notification address carried in the subscription request message.

Address information of the NF may be an IP address and/or an identity of the NF, and the address and the identity of the NF may be in any data format. In addition, in this step, the subscription resource creation request message may be any request message used for UDR to create a subscription resource.

As an example, the subscription resource creation request message may be a new subscription request message generated by a network node, and UDR explicitly creates a subscription resource based on a subscription process.

As another example, the subscription resource creation request message may be a user data update request message generated by a network node, and the UDR implicitly creates a subscription resource based on a user data update process.

Explicit creation refers to a subscription resource being created based on a subscription procedure; implicit creation refers to a subscription resource being created based on a non-subscription procedure.

Based on the solution of this embodiment, the network node may inform the UDR of an address of the NF that initiates the subscription request, so that the UDR may directly send messages related to a subscription resource to the address of the NF in the future, and the segmented subscription of the stateless network node is introduced.

Specifically, the subscription resource creation request message in this embodiment also carries the subscriber address or the notification address, and the subscriber address or the notification address carried in the subscription resource creation request message is an identifier of a node set to which the network node applied in this embodiment belongs.

The node set is composed of multiple stateless network nodes; for example, the network node is the UDM, then the node set is composed of multiple stateless UDMs; and the network node is the PCF, the node set is composed of multiple stateless PCFs. The address information of the node set may be a unique identifier of the node set, or an IP address of the node set.

Based on the above subscription resource creation request message, the UDR sends a notification message related to a subscription resource to any network node in the node set according to the identifier of the node set, so that the network node receiving the notification message further forwards the notification message to the NF. That is, the subscription processing method of this embodiment further includes steps 103-104.

Step 103: receiving the notification message sent by the UDR, where the notification message carries the identifier of the node set to which the network node belongs and the original subscriber address or original notification address carried in the subscription resource creation request message.

Step 104: sending the notification message to the original subscriber address or the original notification address carried in the notification message according to the original subscriber address or original notification address.

In addition, the subscription processing method of this embodiment may also allow the NF to initiate an operation request related to a subscription resource to any stateless network node in the node set.

An example is a subscription deletion request for a subscription resource. That is, the processing method of this embodiment further includes steps 105-106.

Step 105: receiving the subscription deletion request message sent by the NF, wherein the subscription deletion request message carries the identifier of the node set to which the network node belongs and the subscription resource identifier allocated by the UDR to the subscription resource.

Step 106: sending a subscription resource deletion request message to the UDR according to the subscription deletion request message, wherein the subscription resource deletion request message carries a subscription resource identifier allocated by the UDR to the subscription resource.

The UDR may find and delete the subscription resource according to the subscription resource identifier, allocated by the UDR to the subscription resource, in the subscription deletion request message.

Another example is a subscription modification request for a subscription resource. That is, the processing method of this embodiment further includes steps 107-108.

Step 107: receiving a subscription modification request message sent by the NF, wherein the subscription modification request message carries an identifier of the node set to which the network node belongs and a subscription resource identifier allocated by the UDR to the subscription resource.

Step 108: sending a subscription resource modification request message to the UDR according to the subscription modification request message, wherein the subscription resource modification request message carries the subscription resource identifier allocated by the UDR to the subscription resource.

The UDR may find and modify the subscription resource according to the subscription resource identifier, allocated by the UDR to the subscription resource, in the subscription modification request message.

In addition, the subscription processing method of this embodiment may also allow the NF to initiate the subscription modification request message and the subscription deletion request message for a subscription resource to any network node in the node set. That is, the subscription processing method of this embodiment further includes steps 109-110.

Step 109: receiving a subscription resource creation response message returned by the UDR in response to the subscription resource creation request message, wherein the subscription resource creation response message carries a subscription resource address of the subscription resource created by the UDR according to the subscription resource creation request message, and the subscription resource address of the subscription resource includes the subscription resource identifier allocated by the UDR to the subscription resource.

Step 110: returning a subscription response message for the subscription request message to the NF according to the subscription resource creation response message, wherein the subscription response message carries the identifier of the node set to which the network node belongs and the subscription resource identifier allocated by the UDR to the subscription resource.

Based on the above steps, it may be ensured that the NF records the identifier of the node set in a subscription context of a first subscription resource. When the NF needs to delete or modify the subscription resource, the NF may send subscription deletion request information or subscription modification request information to any network node in the node set.

Figure 2:
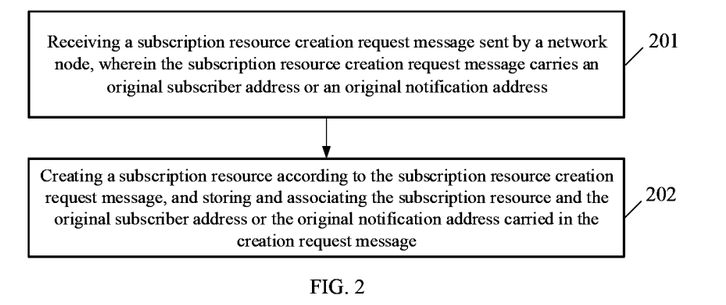
FIG. 2 is a schematic diagram of steps of a subscription processing method applied to a unified data repository according to an embodiment of the present disclosure.

On the other hand, the embodiments of the present disclosure also provide a subscription processing method, which is applied to a unified data repository (UDR), as shown in FIG. 2, the method includes steps 201-202.

Step 201: receiving a subscription resource creation request message sent by a network node, wherein the subscription resource creation request message carries an original subscriber address or an original notification address.

The address information of the NF may be an IP address of the NF, or an identity of the NF. In this step, the subscription resource creation request message may be any request message used for the UDR to create a first subscription resource, or may be a subscription request message regenerated by the network node, or a user data update request message generated by the network node.

Step 202: creating a subscription resource according to the subscription resource creation request message, and storing and associating the subscription resource and the original subscriber address or the original notification address carried in the creation request message.

Based on the subscription processing method of the embodiment, the UDR may obtain, through the network node, a source subscriber of the subscription resource created by the UDR, so that when a message related to the subscription resource is generated, the message related to the subscription resource is directly sent to the source subscriber (that is, the above NF), thereby achieving introduction of segmented subscription for a stateless network node.

For example, the subscription processing method of this embodiment further includes a step 203.

Step 203: sending a notification message to the original subscriber address or the original notification address associated with the subscription resource according to the original subscriber address or original notification address.

Specifically, on basis of the foregoing, the subscription processing method of this embodiment may also allow the UDR to send a notification message to any stateless network node, and a network node receiving the notification message further forwards the notification message to the NF. That is, the subscription resource creation request message of this embodiment also carries a subscriber address or a notification address, and the subscriber address or notification address carried in the subscription resource creation request message is the identifier of the node set to which the network node belongs. The subscription processing methods in this embodiment also includes steps 203-204.

Step 203: associating and storing the subscription resource and the subscriber address or the notification address carried in the creation request message.

Step 204: sending a notification message to the subscriber address or the notification address associated with the subscription resource according to the subscriber address or notification address, wherein the notification message carries the identifier of the node set to which the network node belongs and an original subscriber address or an original notification address carried in the subscription resource creation request message.

Specifically, on basis of the foregoing, the subscription processing method of this embodiment further includes a step 205.

Step 205: sending a subscription resource creation response message to the network node in response to the subscription resource creation request message, wherein the subscription resource creation response message carries a subscription resource address of the subscription resource, and the subscription resource address includes a subscription resource identifier allocated by the UDR to the subscription resource.

The network node receives the subscription resource creation response message returned by the UDR in response to the subscription resource creation request message, and the network node may return a subscription response message for the subscription request message to the NF according to the subscription resource creation response message. The subscription response message carries the identifier of the node set to which the network node belongs and the subscription resource identifier allocated by the UDR to the subscription resource. This allows the NF to subsequently send a subscription deletion request message and a subscription modification request message for the subscription resource to any network node in the node set according to the identifier of the node set.

The subscription processing method of the present disclosure will be introduced in detail below in conjunction with implementations.

First Implementation

Figure 3:
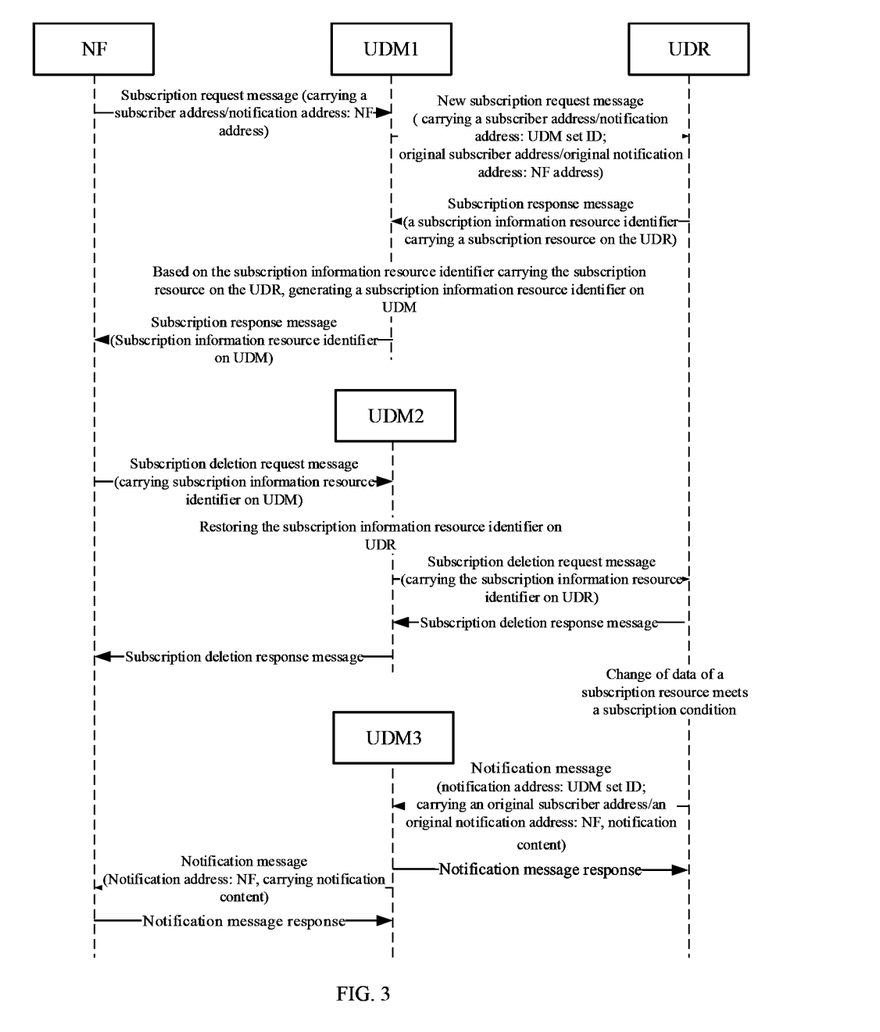
FIG. 3 is a schematic flowchart of first implementation of a subscription processing method provided by an embodiment of the present disclosure.

The network node in this embodiment is UDM, and the node set includes at least UDM1, UDM2, and UDM3. An explicit segmented subscription scenario is adopted among NF-UDM-UDR, and the corresponding subscription processing methods include following.

1. Subscription Creation Procedure

The NF sends a subscription request message to the UDM1, and the subscription request message carries a subscriber address/a notification address, that is, address information of the NF.

The UDM1 receives the subscription request message from the NF and sends a new subscription request message to a UDR. The new subscription request message carries an identifier (UDM Set ID) of a node set to which the UDM1 belongs (as a subscriber address/a notification address in the new subscription request message), an original subscriber address/an original notified address (i.e., the address of the NF).

The UDR returns a subscription response message to the UDM1, and the subscription response message carries a subscription information resource identifier of the subscription resource on the UDR (that is, the subscription resource address allocated to the subscription resource in a process of creating the subscription resource by the UDR).

The UDM1 adds the UDM Set ID to the subscription information resource identifier of the subscription resource on the UDR, and generates a subscription information resource identifier of the subscription resource on the UDM.

The UDM1 sends to the NF a subscription response message carrying the subscription information resource identifier of the subscription resource on the UDM, to ensure that the NF records the UDM Set ID in a subscription context.

2. Subscription Deletion Procedure

The NF sends a subscription deletion request message for the subscription resource to the UDM2 under the UDM Set ID, and the subscription deletion request message carries the subscription information resource identifier of the subscription resource on the UDM.

The UDM2 receives the subscription deletion request message. If the subscription information resource identifier of the subscription resource on the UDM includes the UDM Set ID, the UDM Set ID is deleted, and the subscription information resource identifier of the subscription resource on the UDR is restored.

The UDM2 sends to the UDR a subscription delete request message including the restored subscription information resource identifier of the subscription resource on the UDR.

The UDR finds and deletes the subscription resource according to the subscription information resource identifier of the subscription resource on the UDR in the subscription deletion request message, and returns the subscription deletion response message to the UDM2.

The UDM2 further sends the subscription deletion response message to the NF.

3. Subscription Notification Procedure

The UDR changes data of the subscription resource when it is determined that a change of the data of the subscription resource meets a subscription condition.

Based on the UDM Set ID, the UDR sends a notification message to any stateless UDM3 under the UDM Set ID. A notification address of the notification message is the UDM set ID, which carries the original subscriber address/the original notification address (that is, address information of the NF) and content of the notification (for example, the changed data of the subscription resource).

The UDM receives the notification message, returns a response to the UDR, and forwards the notification message to the NF based on the original subscriber address/original notify-party address therein.

After the NF receives the notification message, the NF sends a response to the UDM3.

Second Implementation

Figure 4:
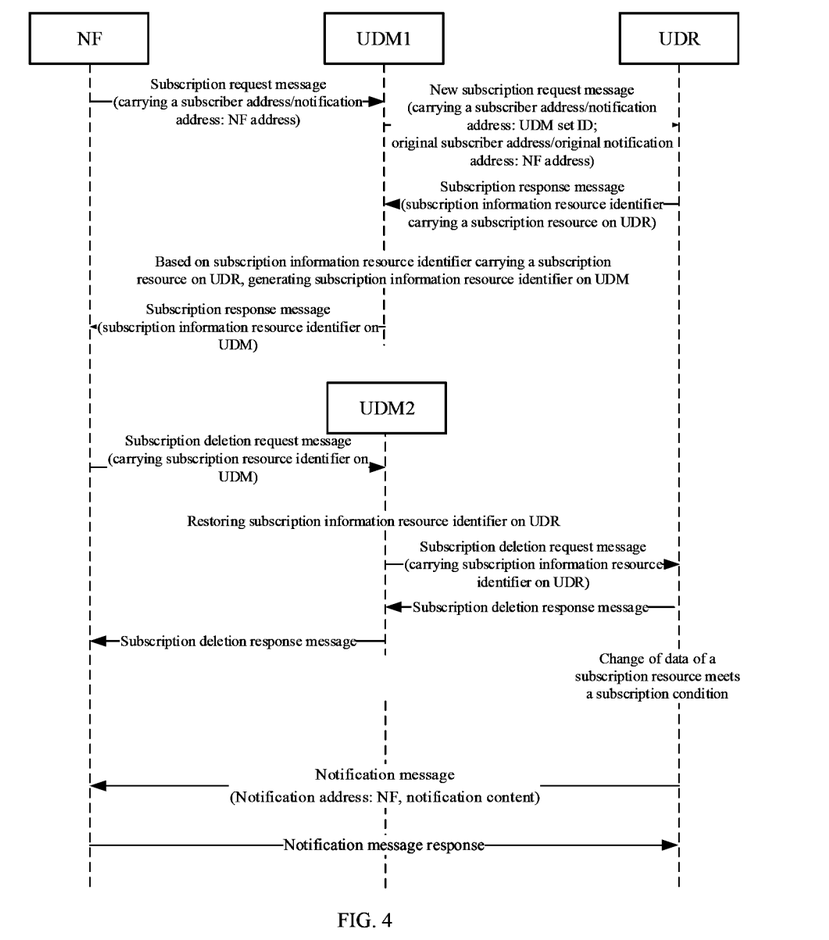
FIG. 4 is a schematic flowchart of second implementation of a subscription processing method provided by an embodiment of the present disclosure.

The network node in this embodiment is UDM, and the node set includes at least UDM1, UDM2, and UDM3. An explicit segmented subscription scenario is adopted among NF-UDM-UDR, and the corresponding subscription processing methods include following.

1. Subscription Creation Procedure

The NF sends a subscription request message to the UDM1, and the subscription request message carries a subscriber address/a notification address, that is, address information of the NF.

The UDM1 receives the subscription request message from the NF and sends a new subscription request message to the UDR. The new subscription request message carries the identifier (UDM Set ID) of the node set to which the UDM1 belongs (as the subscriber address/notification address in the new subscription request message), and the original subscriber address/the original notified address (i.e., the address of the NF).

The UDR returns a subscription response message to the UDM1, and the subscription response message carries the subscription information resource identifier of the subscription resource on the UDR (that is, the subscription resource address allocated to the subscription resource in a process of creating the subscription resource by the UDR).

The UDM1 adds the UDM Set ID to the subscription information resource identifier of the subscription resource on the UDR, and generates the subscription information resource identifier of the subscription resource on the UDM.

The UDM1 sends to the NF a subscription response message carrying the subscription information resource identifier of the subscription resource on the the UDM, to ensure that the NF records the UDM Set ID in a subscription context.

2. Subscription Deletion Procedure

The NF sends a subscription deletion request message for the subscription resource to the UDM2 under the UDM Set ID, and the subscription deletion request message carries the subscription information resource identifier of the subscription resource on the UDM.

The UDM2 receives the subscription deletion request message. If the subscription information resource identifier of the subscription resource on the UDM contains the UDM Set ID, the UDM Set ID is deleted, and the subscription information resource identifier of the subscription resource on the UDR is restored.

The UDM2 sends to the UDR a subscription delete request message including the restored subscription information resource identifier of the subscription resource on the UDR.

The UDR finds and deletes the subscription resource according to the subscription information resource identifier of the subscription resource in the subscription deletion request message, and returns a subscription deletion response message to the UDM2.

The UDM2 further sends the subscription deletion response message to the NF.

3. Subscription Notification Procedure

The UDR changes data of the subscription resource when it is determined that a change of the data of the subscription resource meets a subscription condition.

The UDR directly sends a notification message to the NF based on the original subscriber address/original notification address. A notification address of the notification message is the NF address and carries notification content (for example, the changed data of the subscription resource).

The NF receives the notification message and returns a response to the notification message to the UDR.

Third Implementation

Figure 5:
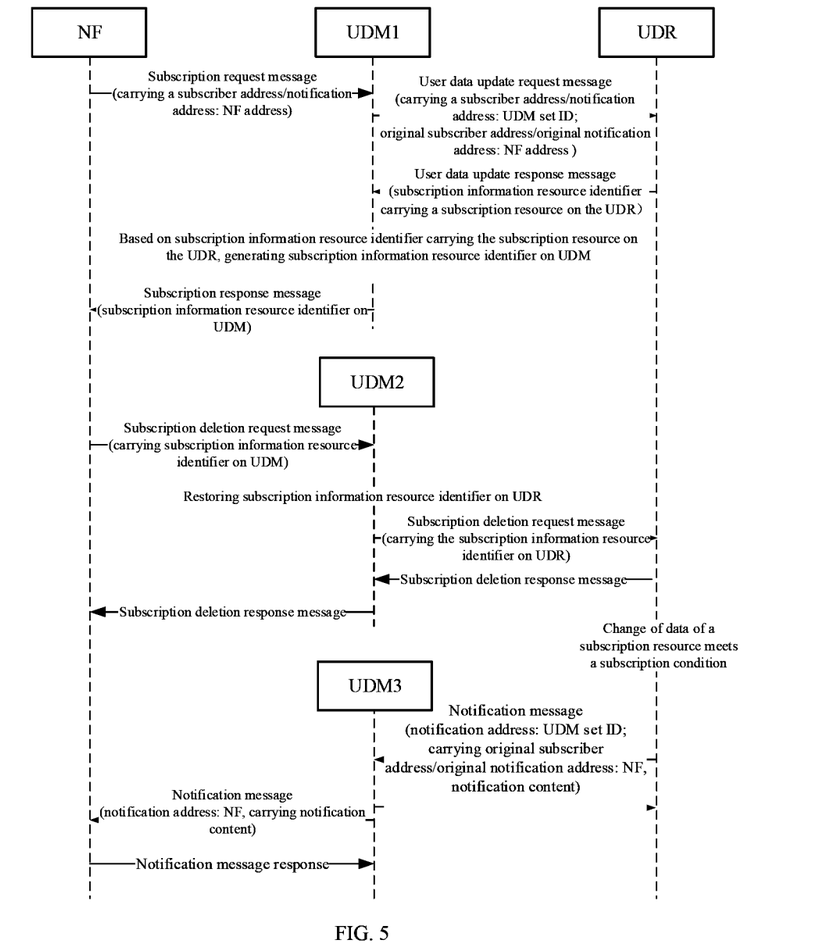
FIG. 5 is a schematic flowchart of third implementation of a subscription processing method provided by an embodiment of the present disclosure.

The network node in this embodiment is the UDM, and the node set includes at least UDM1, UDM2, and UDM3. The implicit segmented subscription scenario is adopted among NF-UDM-UDR, and the corresponding subscription processing methods include following.

1. Subscription Creation Procedure

The NF sends a subscription request message to the UDM1, and the subscription request message carries the subscriber address/notification address, that is, address information of the NF.

The UDM1 receives the subscription request message from the NF and sends a user update request message to the UDR. The user update request message carries an identifier (UDM Set ID) of the node set to which the UDM1 belongs (as the subscriber address/notification address in a new subscription request message), and an address of the original subscriber/the original notified address (i.e. the address of the NF).

The UDR sends to the UDM1 a user update request response message, and a user data update response message carries a subscription information resource identifier of the subscription resource on the UDR (i.e., a subscription resource address allocated to the subscription resource during creating the subscription resource by the UDR).

The UDM1 adds the UDM Set ID to the subscription information resource identifier of the subscription resource on the UDR, and generates the subscription information resource identifier of the subscription resource on the UDM.

The UDM1 sends to the NF a subscription response message carrying the subscription information resource identifier of the subscription resource on the UDM, to ensure that the NF records the UDM Set ID in a subscription context.

2. Subscription Deletion Procedure

The NF sends a subscription deletion request message for the subscription resource to the UDM2 under the UDM Set ID, and the subscription deletion request message carries the subscription information resource identifier of the subscription resource on the UDM.

The UDM2 receives the subscription deletion request message. If the subscription information resource identifier of the subscription resource on the UDM contains the UDM Set ID, the UDM Set ID is deleted, and the subscription information resource identifier of the subscription resource on the UDR is restored.

The UDM2 sends to the UDR a subscription delete request message including the restored subscription information resource identifier of the subscription resource on the UDR.

The UDR finds and deletes the subscription resource according to the subscription information resource identifier of the subscription resource on the UDR in the subscription deletion request message, and returns the subscription deletion response message to the UDM2.

The UDM2 further sends the subscription deletion response message to the NF.

3. Subscription Notification Procedure

The UDR changes data of the subscription resource when it is determined that a change of the data of the subscription resource meets a subscription condition.

Based on the UDM Set ID, the UDR sends a notification message to any stateless UDM3 under the UDM Set ID. A notification address of the notification message is the UDM set ID, which carries the original subscriber address/the original notification address (that is, address information of the NF) and notification content (for example, the changed data of the subscription resource).

The UDM receives the notification message, returns a response to the UDR, and forwards the notification message to the NF based on the original subscriber address/the original notify-part address.

After the NF receives the notification message, the NF sends a response to the UDM3.

Fourth Implementation

Figure 6:
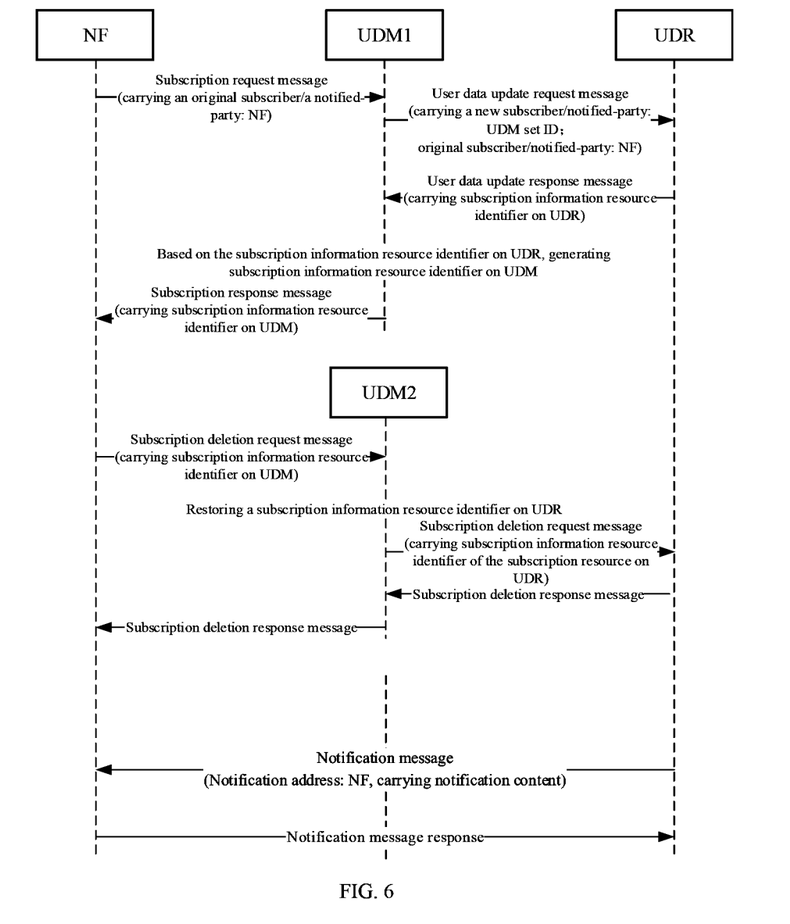
FIG. 6 is a schematic flowchart of fourth implementation of a subscription processing method provided by an embodiment of the present disclosure.

The network node in this embodiment is the UDM, and the node set includes at least UDM1, UDM2, and UDM3. The implicit segmented subscription scenario is adopted among NF-UDM-UDR, and the corresponding subscription processing methods include following.

1. Subscription Creation Procedure

The NF sends a subscription request message to the UDM1, and the subscription request message carries a subscriber address/notification address, that is, address information of the NF.

The UDM1 receives the subscription request message from the NF and sends a user data update request message to the UDR. The user data update request message carries the identifier (UDM Set ID) of the node set to which the UDM1 belongs (as the subscriber address/notification address in a new subscription request message), and the address of the original subscriber/the original notified address (i.e., the address of the NF).

The UDR returns a user data update response message to the UDM1, and the user data update response message carries the subscription information resource identifier (that is, the subscription resource address allocated to the subscription resource during creating the subscription resource by the UDR) of the subscription resource on the UDR.

The UDM1 adds the UDM Set ID to the subscription information resource identifier of the subscription resource on the UDR, and generates the subscription information resource identifier of the subscription resource on the UDM.

The UDM1 sends to the NF a subscription response message carrying the subscription information resource identifier of the subscription resource on the UDM, to ensure that the NF records the UDM Set ID in a subscription context.

2. Subscription Deletion Procedure

The NF sends a subscription deletion request message for the subscription resource to the UDM2 under the UDM Set ID, and the subscription deletion request message carries the subscription information resource identifier of the subscription resource on the UDM.

The UDM2 receives the subscription deletion request message. If the subscription information resource identifier of the subscription resource on the UDM contains the UDM Set ID, the UDM Set ID is deleted, and the subscription information resource identifier of the subscription resource on the UDR is restored.

The UDM2 sends to the UDR a subscription delete request message including the restored subscription information resource identifier of the subscription resource on the UDR.

The UDR finds and deletes the subscription resource according to the subscription information resource identifier of the subscription resource on the UDR in the subscription deletion request message, and returns a subscription deletion response message to the UDM2.

The UDM2 further sends the subscription deletion response message to the NF.

3. Subscription Notification Procedure

The UDR changes data of the subscription resource when it is determined that a change of the data of the subscription resource meets a subscription condition.

The UDR directly sends a notification message to the NF based on the original subscriber address/original notification address. A notification address of the notification message is the address of the NF and carries notification content (for example, the changed data of the subscription resource).

The NF receives the notification message and returns a notification message response to the UDR.

Based on the above implementations, it may be seen that the subscription processing method of the present disclosure has the following effects.

1) The NF may send requests related to subscription management to any UDM in a group of stateless UDMs.

2) The UDR may send notification messages to any UDM in a group of stateless UDMs.

3) The implementations may be flexibly applied to explicit subscription and implicit subscription.

It should be noted that the foregoing implementations only provide an exemplary introduction. In addition to the UDM, the network node may also be the PCF or the NEF.

Figure 7:
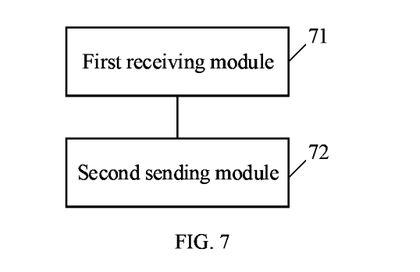
FIG. 7 is a schematic diagram of a logical structure of a network node provided by an embodiment of the present disclosure.

In addition, the embodiment of the present disclosure also provides a network node, as shown in FIG. 7, the network node includes a first receiving module 71 and a first sending module 72.

The first receiving module 71 is configured for receiving a subscription request message sent by a network function (NF) entity. The subscription request message carries a subscriber address or a notification address. The subscriber address or the notification address carried in the subscription request message is an address of the network function (NF) entity.

The first sending module 72 is configured for sending a subscription resource creation request message to a unified data repository (UDR) according to the subscription request message. The subscription resource creation request message carries an original subscriber address or an original notification address, and the original subscriber address of the subscription resource creation request message is the subscriber address carried in the subscription request message, and the original notification address carried in the subscription resource creation request message is a notification address carried in the subscription request message Obviously, the network node of this embodiment is an execution entity of the subscription processing method applied to the network node provided by the present disclosure. Thus, technical effects achievable by the subscription processing method may also be achieved by the network node of this embodiment.

Optionally, the subscription resource creation request message further carries a subscriber address or a notification address, and the subscriber address or notification address carried in the subscription resource creation request message is an identifier of a node set to which the network node belongs.

Optionally, the network node in this embodiment further includes a second receiving module and a second sending module.

The second receiving module is configured for receiving a subscription resource creation response message returned by the UDR in response to a subscription resource creation request message, wherein the subscription resource creation response message carries a subscription resource address of a subscription resource created by the UDR according to the subscription resource creation request message, the subscription resource address of the subscription resource includes a subscription resource identifier allocated by the UDR for the subscription resource.

The second sending module is configured for returning a subscription response message for the subscription request message to the NF according to the subscription resource creation response message, wherein the subscription response message carries the identifier of the node set to which the network node belongs and the subscription resource identifier allocated by the UDR to the subscription resource.

Optionally, the network node in this embodiment further includes a third receiving module and a third sending module.

The third receiving module is configured for receiving a subscription deletion request message sent by the NF, wherein the subscription deletion request message carries an identifier of a node set to which the network node belongs and the subscription resource identifier allocated by the UDR to the subscription resource.

The third sending module is configured for sending a subscription resource deletion request message to the UDR according to the subscription deletion request message, wherein the subscription resource deletion request message carries a subscription resource identifier allocated by the UDR to the subscription resource.

Optionally, the network node in this embodiment further includes a fourth receiving module and a fourth sending module.

The fourth receiving module is configured for receiving a subscription modification request message sent by the NF, wherein the subscription modification request message carries an identifier of the node set to which the network node belongs and a subscription resource identifier allocated by the UDR to the subscription resource.

The fourth sending module is configured for sending a subscription resource modification request message to the UDR according to the subscription modification request message, wherein the subscription resource modification request message carries the subscription resource identifier allocated by the UDR to the subscription resource.

Optionally, the subscription resource creation request message is specifically a regenerated subscription request message, or is a request message updating user data.

Optionally, the network node in this embodiment further includes a fifth receiving module and a fifth sending module.

The fifth receiving module is configured for receiving a notification message sent by the UDR, where the notification message carries an identifier of the node set to which the network node belongs and an original subscriber address or an original notification address carried in the subscription resource creation request message.

The fifth sending module is configured for sending the notification message to the original subscriber address or the original notification address carried in the notification message according to the original subscriber address or original notification address.

Figure 8:
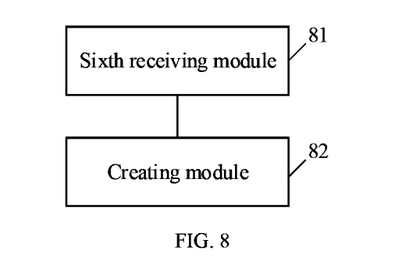
FIG. 8 is a schematic diagram of a logical structure of a unified data repository provided by an embodiment of the present disclosure.

In addition, the embodiments of the present disclosure further provide a network node. As shown in FIG. 8, the network node includes a sixth sending module 81 and a creating module 82.

The sixth sending module 81 is configured for receiving a subscription resource creation request message sent by a network node, wherein the subscription resource creation request message carries an original subscriber address or an original notification address.

The creating module 82 is configured for creating a subscription resource according to the subscription resource creation request message, and storing and associating the subscription resource and the original subscriber address or the original notification address carried in the creation request message.

Obviously, the unified data repository of this embodiment is an execution entity of the subscription processing method applied to the unified data repository provided by the present disclosure. Thus, technical effects achievable by the subscription processing method may also be achieved by the unified data repository of this embodiment.

Optionally, the subscription resource creation request message further carries a subscriber address or a notification address, the subscriber address or the notification address carried in the subscription resource creation request message is an identifier of a node set to which the network node belongs.

Optionally, the UDR in this embodiment further includes a sixth sending module. The sixth sending module is configured for sending a subscription resource creation response message to the network node in response to the subscription resource creation request message, wherein the subscription resource creation response message carries a subscription resource address of the subscription resource, and the subscription resource address includes a subscription resource identifier allocated by the UDR to the subscription resource.

Optionally, the UDR in this embodiment further includes a seventh sending module. The seventh sending module is configured for sending a notification message to an original subscriber address or an original notification address associated with the subscription resource according to the original subscriber address or the original notification address.

Optionally, the UDR in this embodiment further includes an eighth sending module. The eighth sending module is configured for sending a notification message to the subscriber address or the notification address associated with the subscription resource according to the subscriber address or notification address, wherein the notification message carries the identifier of the node set to which the network node belongs and an original subscriber address or an original notification address carried in the subscription resource creation request message.

Figure 9:
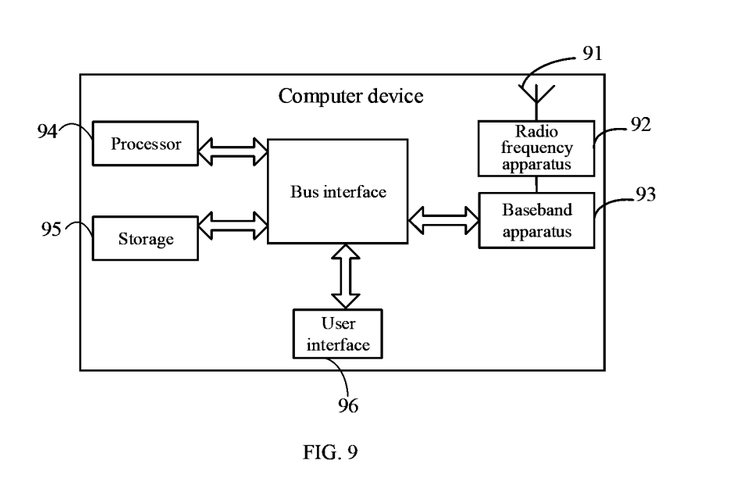
FIG. 9 is a schematic diagram of a physical structure of a computer device provided by an embodiment of the present disclosure.

In addition, an embodiment of the present disclosure also provides a computer device. As shown in FIG. 9, the computer device includes an antenna 91, a radio frequency apparatus 92, a baseband apparatus 93, a processor 94, a storage 95, a user interface 96, and a bus interface.

The bus interface may include any number of interconnected buses and bridges. Specifically, various circuits such as one or more processors represented by the processor and a storage represented by the storage 95 are linked together. The bus architecture may also link various other circuits such as peripherals, voltage regulators, power management circuits, etc., which are all known in the art, and therefore, no further descriptions are provided herein. The bus interface provides an interface. The antenna 91, the radio frequency apparatus 92, and the baseband apparatus 93 together form a transmitter and a receiver, and provide a unit for communicating with various other apparatuses over a transmission medium. For different user equipments, the user interface 96 may also be an interface capable of connecting externally and internally with a required device, and the connected device includes, but is not limited to, a keypad, a display, a speaker, a microphone, a joystick, and the like.

The processor 94 is responsible for managing the bus interface and general processing, and the storage 95 may store data used by the processor 94 when performing operations.

In a case that the computing device in this embodiment is a network node, when the above computer program is executed by the processor 94, the processor 94 implements following steps: receiving a subscription request message sent by a network function (NF) entity, wherein the subscription request message carries a subscriber address or a notification address, the subscriber address or the notification address carried in the subscription request message is an address of the network function (NF) entity; sending a subscription resource creation request message to a unified data repository (UDR) according to the subscription request message, wherein the subscription resource creation request message carries an original subscriber address or an original notification address, and the original subscriber address of the subscription resource creation request message is a subscriber address carried in the subscription request message, and the original notification address carried in the subscription resource creation request message is a notification address carried in the subscription request message.

Optionally, the subscription resource creation request message further carries a subscriber address or a notification address, and the subscriber address or notification address carried in the subscription resource creation request message is an identifier of a node set to which the network node belongs.

Optionally, in a case that the computing device in this embodiment is a network node, when the computer program is executed by the processor 94, the processor 94 further implements following steps: receiving a subscription resource creation response message returned by the UDR in response to the subscription resource creation request message, wherein the subscription resource creation response message carries a subscription resource address of the subscription resource created by the UDR according to the subscription resource creation request message, and the subscription resource address of the subscription resource includes the subscription resource identifier allocated by the UDR to the subscription resource; returning a subscription response message for the subscription request message to the NF according to the subscription resource creation response message, wherein the subscription response message carries the identifier of the node set to which the network node belongs and the subscription resource identifier allocated by the UDR to the subscription resource.

Optionally, in a case that the computing device in this embodiment is the network node, when the computer program is executed by the processor 94, the processor 94 further implements following steps: receiving a subscription deletion request message sent by the NF, wherein the subscription deletion request message carries the identifier of the node set to which the network node belongs and the subscription resource identifier allocated by the UDR to the subscription resource; sending a subscription resource deletion request message to the UDR according to the subscription deletion request message, wherein the subscription resource deletion request message carries a subscription resource identifier allocated by the UDR to the subscription resource.

Optionally, in a case that the computing device in this embodiment is the network node, when the computer program is executed by the processor 94, the processor 94 further implements following steps: receiving a subscription modification request message sent by the NF, wherein the subscription modification request message carries an identifier of the node set to which the network node belongs and a subscription resource identifier allocated by the UDR to the subscription resource; sending a subscription resource modification request message to the UDR according to the subscription modification request message, wherein the subscription resource modification request message carries the subscription resource identifier allocated by the UDR to the subscription resource.

Optionally, the subscription resource creation request message is specifically a regenerated subscription request message, or a request message updating user data.

Optionally, in a case that the computing device in this embodiment is the network node, when the computer program is executed by the processor 94, the processor 94 further implements following steps: receiving a notification message sent by the UDR, wherein the notification message carries the identifier of the node set to which the network node belongs and the original subscriber address or original notification address carried in the subscription resource creation request message; sending the notification message to the original subscriber address or the original notification address carried in the notification message according to the original subscriber address or original notification address.

Optionally, the subscriber address or the notification address may be an identity of the NF or an IP address of the NF.

Optionally, the network node in the node set is one of the UDM, the PCF, and the NEF.

In addition, in a case that the computing device in this embodiment is a UDR, when the computer program is executed by the processor 94, the processor 94 implements following steps: receiving a subscription resource creation request message sent by a network node, wherein the subscription resource creation request message carries an original subscriber address or an original notification address; creating a subscription resource according to the subscription resource creation request message, and storing and associating the subscription resource and the original subscriber address or the original notification address carried in the creation request message.

Optionally, the subscription resource creation request message further carries a subscriber address or a notification address, and the subscriber address or notification address carried in the subscription resource creation request message is an identifier of the node set to which the network node belongs.

Optionally, in a case that the computing device in this embodiment is a UDR, when the computer program is executed by the processor 94, the processor 94 further implements a following step: storing and associating the subscription resource and the subscriber address or the notification address carried in the creation request message.

Optionally, in a case that the computing device in this embodiment is a UDR, when the computer program is executed by the processor 94, the processor 94 further implements a following step: sending a subscription resource creation response message to the network node in response to the subscription resource creation request message, wherein the subscription resource creation response message carries a subscription resource address of the subscription resource, and the subscription resource address includes a subscription resource identifier allocated by the UDR to the subscription resource.

Optionally, in a case that the computing device in this embodiment is a UDR, when the computer program is executed by the processor 94, the processor 94 further implements a following step: sending a notification message to the original subscriber address or the original notification address associated with the subscription resource according to the original subscriber address or original notification address.

Optionally, in a case that the computing device in this embodiment is a UDR, when the computer program is executed by the processor 94, the processor 94 further implements a following step: sending a notification message to the subscriber address or the notification address associated with the subscription resource according to the subscriber address or notification address, wherein the notification message carries the identifier of the node set to which the network node belongs and an original subscriber address or an original notification address carried in the subscription resource creation request message.

Additionally, another embodiment of the present disclosure further provides a computer-readable storage medium, on which a computer program is stored.

In a case that the computer-readable storage medium in this embodiment is applied to a network node, when the computer program is executed by a processor, the processor implements following steps: receiving a subscription request message sent by a network function (NF) entity, wherein the subscription request message carries a subscriber address or a notification address, the subscriber address or the notification address carried in the subscription request message is an address of the network function (NF) entity; sending a subscription resource creation request message to a unified data repository (UDR) according to the subscription request message, wherein the subscription resource creation request message carries an original subscriber address or an original notification address, and the original subscriber address of the subscription resource creation request message is a subscriber address carried in the subscription request message, and the original notification address carried in the subscription resource creation request message is a notification address carried in the subscription request message.

Optionally, the subscription resource creation request message further carries a subscriber address or a notification address, and the subscriber address or notification address carried in the subscription resource creation request message is an identifier of a node set to which the network node belongs.

Optionally, in a case that the computer-readable storage medium in this embodiment is applied to a network node, when the computer program is executed by a processor, the processor implements following steps: receiving a subscription resource creation response message returned by the UDR in response to the subscription resource creation request message, wherein the subscription resource creation response message carries a subscription resource address of the subscription resource created by the UDR according to the subscription resource creation request message, and the subscription resource address of the subscription resource includes the subscription resource identifier allocated by the UDR to the subscription resource; returning a subscription response message for the subscription request message to the NF according to the subscription resource creation response message, wherein the subscription response message carries the identifier of the node set to which the network node belongs and the subscription resource identifier allocated by the UDR to the subscription resource.

Optionally, in a case that the computer-readable storage medium in this embodiment is applied to a network node, when the computer program is executed by a processor, the processor implements following steps: receiving a subscription deletion request message sent by the NF, wherein the subscription deletion request message carries the identifier of the node set to which the network node belongs and the subscription resource identifier allocated by the UDR to the subscription resource; sending a subscription resource deletion request message to the UDR according to the subscription deletion request message, wherein the subscription resource deletion request message carries a subscription resource identifier allocated by the UDR to the subscription resource.

Optionally, in a case that the computer-readable storage medium in this embodiment is applied to a network node, when the computer program is executed by a processor, the processor implements following steps: receiving a subscription modification request message sent by the NF, wherein the subscription modification request message carries an identifier of the node set to which the network node belongs and a subscription resource identifier allocated by the UDR to the subscription resource; sending a subscription resource modification request message to the UDR according to the subscription modification request message, wherein the subscription resource modification request message carries the subscription resource identifier allocated by the UDR to the subscription resource.

Optionally, the subscription resource creation request message is specifically a regenerated subscription request message, or a request message updating user data.

Optionally, in a case that the computer-readable storage medium in this embodiment is applied to a network node, when the computer program is executed by a processor, the processor implements following steps: receiving a notification message sent by the UDR, wherein the notification message carries the identifier of the node set to which the network node belongs and the original subscriber address or original notification address carried in the subscription resource creation request message; sending the notification message to the original subscriber address or the original notification address carried in the notification message according to the original subscriber address or original notification address.

Optionally, the subscriber address or the notification address may be an identity of the NF or an IP address of the NF.

Optionally, the network node in the node set is one of the UDM, the PCF, and the NEF.

In addition, in a case that the computer-readable storage medium in this embodiment is applied to a UDR, when the computer program is executed by a processor, the processor implements following steps: receiving a subscription resource creation request message sent by a network node, wherein the subscription resource creation request message carries an original subscriber address or an original notification address; creating a subscription resource according to the subscription resource creation request message, and storing and associating the subscription resource and the original subscriber address or the original notification address carried in the creation request message.

Optionally, the subscription resource creation request message further carries a subscriber address or a notification address, and the subscriber address or notification address carried in the subscription resource creation request message is an identifier of the node set to which the network node belongs.

Optionally, in a case that the computer-readable storage medium in this embodiment is applied to a UDR, when the computer program is executed by a processor, the processor implements a following step: storing and associating the subscription resource and the subscriber address or the notification address carried in the creation request message.

Optionally, in a case that the computer-readable storage medium in this embodiment is applied to a UDR, when the computer program is executed by a processor, the processor implements a following step: sending a subscription resource creation response message to the network node in response to the subscription resource creation request message, wherein the subscription resource creation response message carries a subscription resource address of the subscription resource, and the subscription resource address includes a subscription resource identifier allocated by the UDR to the subscription resource.

Optionally, in a case that the computer-readable storage medium in this embodiment is applied to a UDR, when the computer program is executed by a processor, the processor implements a following step: sending a notification message to the original subscriber address or the original notification address associated with the subscription resource according to the original subscriber address or original notification address.

Optionally, in a case that the computer-readable storage medium in this embodiment is applied to a UDR, when the computer program is executed by a processor, the processor implements a following step: sending a notification message to the subscriber address or the notification address associated with the subscription resource according to the subscriber address or notification address, wherein the notification message carries the identifier of the node set to which the network node belongs and an original subscriber address or an original notification address carried in the subscription resource creation request message.

The above are optional embodiments of the present disclosure. It should be noted that those of ordinary skills in the art may make various modifications and refinements without departing from the principle of the present disclosure. Such modifications and refinements are also considered to fall in the protection scope of the present disclosure.

Unless defined otherwise, technical terms or scientific terms used in the present disclosure should have a common meaning understood by a person of ordinary skills in the art to which the present disclosure belongs. Such a word as "include" or "comprise" used herein or the like mean that an element or an article before the word encompasses an element or an article or the like enumerated after the word, without excluding existence of other elements or articles.

What is claimed is:

1. A subscription processing method applied to a network node, comprising:

receiving a subscription request message sent by a network function (NF) entity, wherein the subscription request message carries a notification address, the notification address carried in the subscription request message is an address of the NF entity;

sending a subscription resource creation request message to a unified data repository (UDR) according to the subscription request message, wherein the subscription resource creation request message carries a notification address and an original notification address, the original notification address carried in the subscription resource creation request message is the notification address carried in the subscription request message, the notification address carried in the subscription resource creation request message is an identifier of a node set to which the network node belongs; and receiving a subscription resource creation response message returned by the UDR in response to the subscription resource creation request message, wherein the subscription resource creation response message carries a subscription resource address of a subscription resource created by the UDR according to the subscription resource creation request message, and the subscription resource address of the subscription resource comprises a subscription resource identifier allocated by the UDR to the subscription resource.

2. The subscription processing method according to claim 1, further comprising:
returning a subscription response message for the subscription request message to the NF entity according to the subscription resource creation response message, wherein the subscription response message carries an identifier of a node set to which the network node belongs and the subscription resource identifier allocated by the UDR to the subscription resource.

3. The subscription processing method according to claim 2, further comprising:
receiving a subscription deletion request message sent by the NF entity, wherein the subscription deletion request message carries the identifier of the node set to which the network node belongs and the subscription resource identifier allocated by the UDR to the subscription resource;
sending a subscription resource deletion request message to the UDR according to the subscription deletion request message, wherein the subscription resource deletion request message carries the subscription resource identifier allocated by the UDR to the subscription resource.

4. The subscription processing method according to claim 2, further comprising:
receiving a subscription modification request message sent by the NF entity, wherein the subscription modification request message carries an identifier of a node set to which the network node belongs and the subscription resource identifier allocated by the UDR to the subscription resource;
sending a subscription resource modification request message to the UDR according to the subscription modification request message, wherein the subscription resource modification request message carries the subscription resource identifier allocated by the UDR to the subscription resource.

5. The subscription processing method according to claim 1, wherein,
the subscription resource creation request message is specifically a regenerated subscription request message, or a request message updating user data.

6. The subscription processing method according to claim 1, further comprising:
receiving a notification message sent by the UDR, wherein the notification message carries an identifier of a node set to which the network node belongs and the original notification address carried in the subscription resource creation request message;
sending the notification message to the original notification address carried in the notification message according to the original notification address.

7. The subscription processing method according to claim 1, wherein,
the notification address in the subscription request message is an identity or FQDN of the NF entity, or an IP address of the NF entity.

8. The subscription processing method according to claim 1, wherein,
the network node in the node set is one of UDM, PCF, and NEF.

9. A computer device, comprising:
a processor, a storage, and a computer program stored on the storage and executable by the processor, wherein when the computer program is executed by the processor, the processor implements the subscription processing method according to claim 1.

10. A non-transitory computer-readable storage medium, comprising:
a computer program stored on the computer-readable storage medium, wherein when the computer program is executed by a processor, the processor implements the subscription processing method according to claim 1.

11. A subscription processing method applied to unified data repository (UDR), comprising:
receiving a subscription resource creation request message sent by a network node, wherein the subscription resource creation request message carries a notification address and an original notification address, wherein the notification address carried in the subscription resource creation request message is an identifier of a node set to which the network node belongs;
creating a subscription resource according to the subscription resource creation request message, and storing and associating the subscription resource and the original notification address and the notification address carried in the creation request message;
sending a subscription resource creation response message to the network node in response to the subscription resource creation request message, wherein the subscription resource creation response message carries a subscription resource address of the subscription resource, and the subscription resource address comprises a subscription resource identifier allocated by the UDR to the subscription resource.

12. The subscription processing method according to claim 11, further comprising:
sending a notification message to the original notification address associated with the subscription resource according to the original notification address.

13. The subscription processing method according to claim 11, further comprising:
sending a notification message to the notification address associated with the subscription resource according to the notification address, wherein the notification message carries an identifier of a node set to which the network node belongs and an original notification address carried in the subscription resource creation request message.

14. A computer device, comprising:
a processor, a storage, and a computer program stored on the storage and executable by the processor, wherein when the computer program is executed by the processor, the processor implements the subscription processing method according to claim 11.

15. A non-transitory computer-readable storage medium, comprising:
a computer program stored on the computer-readable storage medium, wherein when the computer program is executed by a processor, the processor implements the subscription processing method according to claim 11.

* * * * *